(12) United States Patent
Ishii et al.

(10) Patent No.: US 10,917,584 B2
(45) Date of Patent: Feb. 9, 2021

(54) IMAGE DISPLAY DEVICE

(71) Applicant: TOYOTA JIDOSHA KABUSHIKI KAISHA, Toyota (JP)

(72) Inventors: Takahiro Ishii, Toyota (JP); Satoshi Fujisaki, Nagoya (JP); Moriyu Nakashima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 66 days.

(21) Appl. No.: 15/837,277

(22) Filed: Dec. 11, 2017

(65) Prior Publication Data

US 2018/0198991 A1 Jul. 12, 2018

(30) Foreign Application Priority Data

Jan. 11, 2017 (JP) .................. 2017-002612

(51) Int. Cl.
| | |
|---|---|
| *H04N 5/232* | (2006.01) |
| *H04N 5/262* | (2006.01) |
| *H04N 7/18* | (2006.01) |
| *B60R 1/00* | (2006.01) |
| *H04N 5/225* | (2006.01) |

(52) U.S. Cl.
CPC ............ *H04N 5/2628* (2013.01); *B60R 1/00* (2013.01); *H04N 5/23293* (2013.01); *H04N 5/232945* (2018.08); *H04N 7/183* (2013.01); *B60R 2300/30* (2013.01); *B60R 2300/306* (2013.01); *B60R 2300/8046* (2013.01); *B60R 2300/8066* (2013.01); *H04N 5/22525* (2018.08)

(58) Field of Classification Search
CPC combination set(s) only.
See application file for complete search history.

(56) References Cited

U.S. PATENT DOCUMENTS

| | | |
|---|---|---|
| 10,239,456 B1 | 3/2019 | Tao et al. |
| 2002/0167589 A1 | 11/2002 | Schofield et al. |

(Continued)

FOREIGN PATENT DOCUMENTS

| | | |
|---|---|---|
| CN | 104271399 A | 1/2015 |
| JP | 2002-369186 A | 12/2002 |

(Continued)

OTHER PUBLICATIONS

U.S. Appl. No. 15/817,533, filed Nov. 20, 2017 in the name of Takahiro Ishii.

(Continued)

*Primary Examiner* — Md N Haque
(74) *Attorney, Agent, or Firm* — Oliff PLC (57) ABSTRACT

An image display device includes: a camera mounted on a vehicle and configured to take an image representing a view behind the vehicle; an image cutouter configured to cut out a second image, from a first image taken by the camera, based on a reference cutout position in the first image; and a display configured to display the second image cut out by the image cutouter. The image cutouter is configured to, when a display object in the first image is to move in a first direction due to change of an orientation of the vehicle, execute a processing in which a cutout position for the second image at a first time point is moved from the reference cutout position in a second direction opposite to the first direction.

2 Claims, 7 Drawing Sheets

(56) References Cited

U.S. PATENT DOCUMENTS

| | | | |
|---|---|---|---|
| 2004/0016870 A1 | 1/2004 | Pawlicki et al. | |
| 2005/0083427 A1* | 4/2005 | Imoto | B60R 1/00 348/335 |
| 2008/0195285 A1 | 8/2008 | Shimizu | |
| 2009/0079553 A1* | 3/2009 | Yanagi | B60R 1/00 340/435 |
| 2010/0134264 A1 | 6/2010 | Nagamine et al. | |
| 2010/0201816 A1 | 8/2010 | Lee et al. | |
| 2012/0154591 A1* | 6/2012 | Baur | B60R 1/00 348/148 |
| 2012/0169875 A1* | 7/2012 | Matsukawa | B60R 1/00 348/148 |
| 2013/0321629 A1* | 12/2013 | Zhang | B60R 1/00 348/148 |
| 2013/0342658 A1 | 12/2013 | Kuhn et al. | |
| 2014/0347489 A1* | 11/2014 | Kumon | H04N 7/183 348/148 |
| 2015/0294160 A1* | 10/2015 | Takahashi | H04N 13/204 382/104 |
| 2016/0263997 A1* | 9/2016 | Mizutani | B60R 1/00 |
| 2016/0314358 A1 | 10/2016 | Kushida et al. | |
| 2017/0021770 A1* | 1/2017 | Arai | G06T 3/40 |
| 2017/0162042 A1 | 6/2017 | Dooley et al. | |
| 2017/0163863 A1* | 6/2017 | Gomez Timoneda | H04N 5/2259 |
| 2017/0163939 A1* | 6/2017 | Thompson | B60R 1/00 |
| 2017/0174133 A1 | 6/2017 | Kumon | |

FOREIGN PATENT DOCUMENTS

| | | |
|---|---|---|
| JP | 2009-023565 A | 2/2009 |
| JP | 2010-006129 A | 1/2010 |
| JP | 2013-060128 A | 4/2013 |
| JP | 5938703 B2 | 6/2016 |

OTHER PUBLICATIONS

Nov. 25, 2019 Advisory Action issued in U.S. Appl. No. 15/817,533.

Mar. 11, 2020 Supplemental Notice of Allowability issued in U.S. Appl. No. 15/817,533.

Dec. 20, 2019 Notice of Allowance issued in U.S. Appl. No. 15/817,533.

* cited by examiner

LEFT ←——→ RIGHT

FIG.3C

RIGHT ←——→ LEFT

LEFT ⟵⟶ RIGHT

FIG.4C

LEFT ⟵⟶ RIGHT

LEFT ←——→ RIGHT

FIG.5C

RIGHT ←——→ LEFT

IMAGE DISPLAY DEVICE

CROSS REFERENCE TO RELATED APPLICATION

The present application claims priority from Japanese Patent Application No. 2017-002612, which was filed on Jan. 11, 2017, the disclosure of which is herein incorporated by reference in its entirety.

BACKGROUND

The following disclosure relates to an image display device including a display mounted in a passenger compartment, configured to take an image representing a view behind a vehicle, and control the display to display the image representing the view behind the vehicle.

There is known an image display device including a display mounted in a passenger compartment at a position at which a rear-view mirror is mounted, and configured to control the display to display an image that is taken by a camera and represents a view behind the vehicle. Patent Document 1 (Japanese Patent No. 5938703) discloses an image display device configured to: cut out a cutout image which is a portion of an image taken by a camera; display the cutout image on a display; and change a position (a cutout position), at which the cutout image is cut out from the taken image, in accordance with a driver's operation of changing the angle of the display.

SUMMARY

In the image display device as described above, the cutout image is in some cases displayed on the display with delay (image delay) of a time required from a time point when the image is taken by the camera to a time point when the image taken by the camera is processed and displayed on the display. Thus, in the case where an orientation of the vehicle is changed sharply, for example, in the case where the vehicle is driving on a curve at high speed, the image delay may make it impossible for the cutout image displayed on the display to follow the change of the orientation of the vehicle, leading to discomfort given to a driver.

Accordingly, an aspect of the disclosure relates to an image display device capable of reducing discomfort caused when a cutout image is displayed on a display after a change of an orientation of a vehicle.

In one aspect of the disclosure, an image display device includes: a camera mounted on a vehicle and configured to take an image representing a view behind the vehicle; an image cutouter configured to cut out a second image, from a first image taken by the camera, based on a reference cutout position in the first image; and a display configured to display the second image cut out by the image cutouter. The image cutouter is configured to, when a display object in the first image is to move in a first direction due to change of an orientation of the vehicle, execute a processing in which a cutout position for the second image at a first time point is moved from the reference cutout position in a second direction opposite to the first direction.

Effects

In the configuration as described above, the second image at the time point later than the first time point can be cut out from the first image taken at the first time point. This reduces discomfort caused when the second image cut out at the first time point is displayed on the display at the second time point.

Claimable Inventions

There will be described by way of examples forms of inventions recognized to be claimable by the present applicant. The inventions may be hereinafter referred to as "claimable inventions" and include at least the invention as defined in the appended claims. However, the inventions may further include an invention of a concept subordinate or superordinate to the concept of the invention defined in the appended claims, and/or an invention of a concept different from the concept of the invention defined in the appended claims. The forms are numbered like the appended claims and depend from another form or forms, where appropriate, for easy understanding of the invention. It is to be understood that combinations of features of the claimable inventions are not limited to those of the following forms. That is, the claimable inventions are to be construed by taking account of, e.g., the description following each form, the description of the embodiment, and conventional techniques, and as long as the claimable inventions are constructed in this way, any one of the following forms may be implemented with one or more features added, or one or more of a plurality of features included in any one of the following forms are not necessarily provided all together.

(1) An image display device, comprising:
a camera mounted on a vehicle and configured to take an image representing a view behind the vehicle;
an image cutouter configured to cut out a second image, from a first image taken by the camera, based on a reference cutout position in the first image; and
a display configured to display the second image cut out by the image cutouter,
the image cutouter being configured to, when a display object in the first image is to move in a first direction due to change of an orientation of the vehicle, execute a processing in which a cutout position for the second image at a first time point is moved from the reference cutout position in a second direction opposite to the first direction.

In the case where a display object in the first image moves in the first direction due to change of the orientation of the vehicle, a shooting area of the camera moves in the second direction with respect to the first image. Thus, a portion of the first image which is located on a side of the reference cutout position for the second image at the first time point in the second direction is contained in the second image cut out at the reference cutout position at the time point later than the first time point. In the image display device described above, in the case where the display object in the first image is to move in the first direction due to the change of the orientation of the vehicle, the cutout position at the first time point is moved in the second direction, whereby the second image at the time point later than the first time point can be cut out from the first image taken at the first time point.

(2) The image display device according to the above form (1), wherein the image cutouter is configured to display the second image cut out at the first time point, on the display at a second time point that is later than the first time point.

A predetermined length of time is required from a time point when the image cutouter cuts out the second image from the first image taken at the first time point to a time point when the second image is displayed on the display. Thus, the second image cut out from the first image created at the first time point is displayed on the display at the second time point that is reached when the predetermined length of time is elapsed from the first time point. A difference between the first time point and the second time point is a delay time caused by various processings. Even in the case where such a delay time has occurred, the second image at the time point later than the first time point (that is, at the time point closer to the second time point than to the first time point) can be displayed on the display by moving the reference cutout position in the first image in the second direction.

(3) The image display device according to the above form (1) or (2), wherein the image cutouter is configured to move the cutout position for the second image in the first image in the second direction when the orientation of the vehicle is changed by driving of the vehicle on a curve.

When the vehicle is driving on the curve, the orientation of the vehicle changes, and thereby the shooting area of the camera moves in the second direction. Thus, the display object moves in the first image in the first direction. In the image display device described above, when the vehicle drives on the curve, the cutout position in the first image is moved in the second direction, whereby the second image at the time point later than the first time point can be cut out from the first image taken at the first time point.

(4) The image display device according to any one of the above forms (1) through (3), wherein the image cutouter is configured to, when it is detected that the vehicle is to drive on a curve, move the cutout position for the second image in the first image in the second direction such that the cutout position is moved in a direction directed from an inside of the curve toward an outside of the curve.

When the orientation of the vehicle is changed during driving of the vehicle on the curve, the camera takes an image representing a larger area outside the curve. That is, the display object moves in the first image in the direction directed from the outside of the curve toward the inside of the curve. In the image display device described above, the cutout position for the second image at the first time point is moved in the direction directed from the inside of the curve toward the outside of the curve, whereby the second image at the time point later than the first time point can be cut out from the first image taken at the first time point. This processing reduces discomfort which is caused when the second image is displayed on the display.

(5) The image display device according to any one of the above forms (1) through (4), wherein the image cutouter is configured to move the cutout position for the second image in the first image in the second direction, based on a first change amount that is an amount of change of the orientation of the vehicle in a first period extending from the first time point to a second time point that is later than the first time point.

The amount of movement of the display object in the first image is larger when the amount of change of the orientation of the vehicle is large than when the amount of change of the orientation of the vehicle is small. In the image display device described above, the image cutouter is capable of increasing an amount by which the cutout position for the second image is moved, when the magnitude of the first change amount is large and capable of reducing the amount by which the cutout position for the second image is moved, when the magnitude of the first change amount is small.

(6) The image display device according to the above form (5), wherein the image cutouter is configured to:
 calculate the first change amount; and
 execute a processing in which the cutout position for the second image in the first image at the first time point is moved in the second direction by an amount by which the display object in the first image is moved in accordance with the first change amount.

The amount of movement of the display object in the first image depends on the amount of change of the orientation of the vehicle. When the orientation of the vehicle is changed by the first change amount within the first period, a position of the display object in the first image at the second time point is located at a distance of an amount of movement based on the first change amount, from the display object in the first image at the first time point, in the first direction. In the image display device described above, the cutout position for the second image at the first time point is moved in the second direction by the amount of movement of the display object based on the first change amount, whereby the second image at the second time point can be cut out from the first image created at the first time point. Accordingly, it is possible to reduce discomfort which is caused when the second image at the first time point is displayed on the display at the second time point.

(7) The image display device according to any one of the above forms (1) through (6), wherein the image cutouter is configured to change the cutout position for the second image in the first image based on a rudder angle and a vehicle speed of the vehicle.

Detection of the rudder angle and the vehicle speed of the vehicle enables the image cutouter to detect that the vehicle is driving on the curve. When the vehicle is driving on the curve, the orientation of the vehicle is changed, causing the display object in the first image to move in the direction directed from the outside of the curve toward the inside of the curve. In the image display device described above, the cutout position in the first image at the first time point is moved in the direction directed from the inside of the curve toward the outside of the curve, whereby the second image at the time point later than the first time point can be cut out from the first image created at the first time point.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which;

FIG. 30 is a view of an image reflected in an inner mirror when the own vehicle is located at a vehicle position $P_2$ in FIG. 3A;

FIG. 40 is a view of an image taken by the camera, the image representing a view behind the own vehicle located at a vehicle position $P_4$ in FIG. 4A;

DETAILED DESCRIPTION OF THE EMBODIMENTS

Hereinafter, there will be described one embodiment by reference to the drawings.

Figure 1:
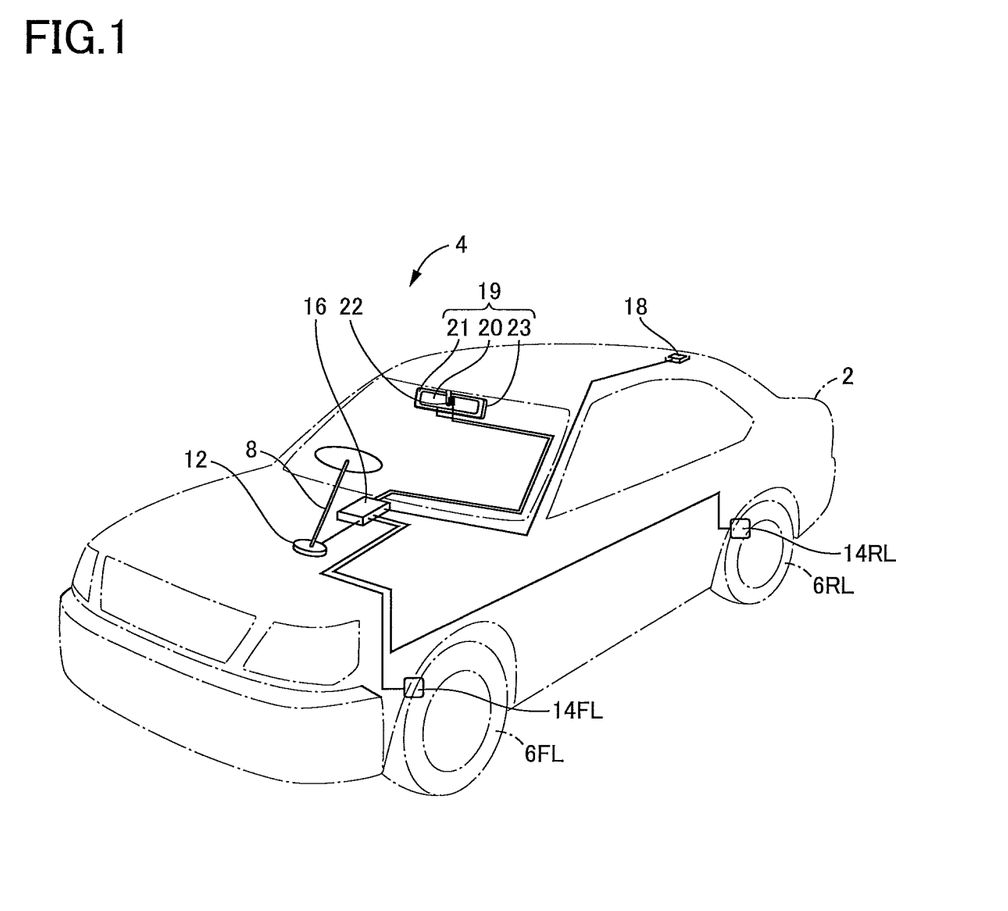
FIG. 1 is a view illustrating an overall construction of a vehicle installed with an image display device according to a first embodiment.
Figure 2:
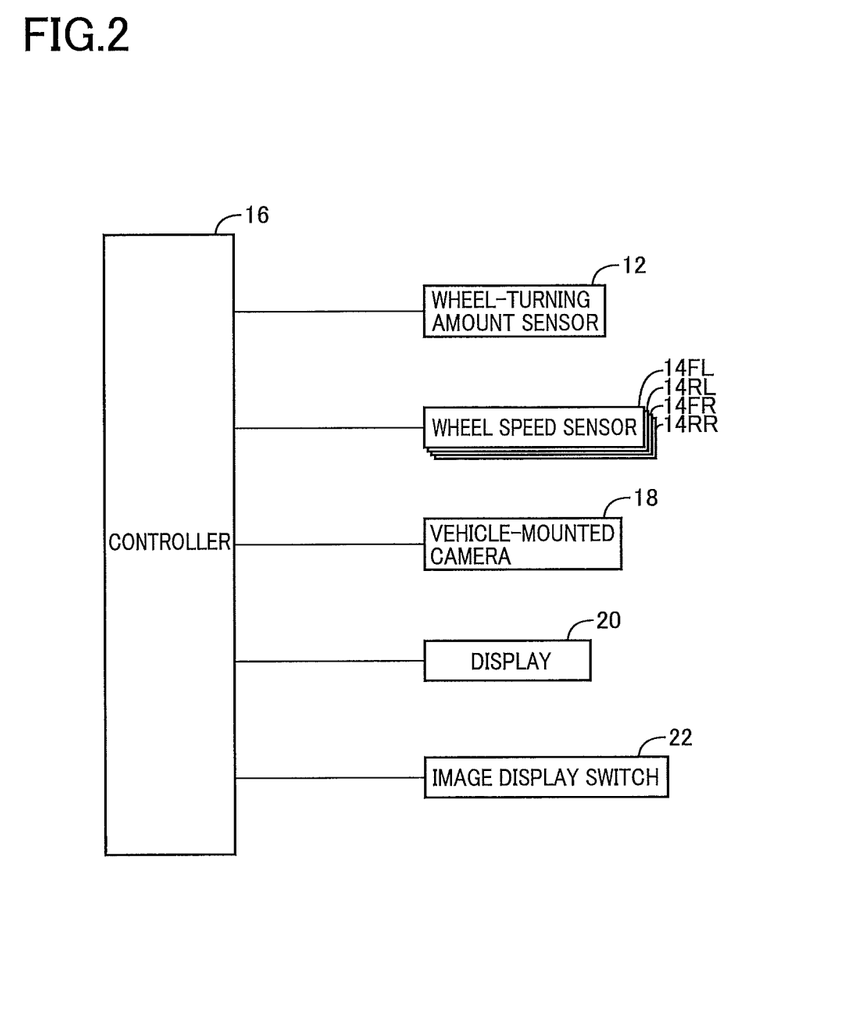
FIG. 2 is a schematic view illustrating electric connection of a controller in the first embodiment.

FIG. 1 is a view of a vehicle 2 on which an image display device 4 according to a first embodiment is mounted. FIG. 2 is a schematic view illustrating an overall configuration of the image display device 4 according to the first embodiment. As illustrated in FIG. 1, the vehicle 2 includes the image display device 4, wheels 6, a steering 8, a wheel turning amount sensor 12, and wheel speed sensors 14. As illustrated in FIG. 2, the image display device 4 includes a controller 16, a vehicle-mounted camera 18, a rear image display device 19, and an image display switch 22.

The wheel-turning amount sensor 12 is provided on the steering 8 of the vehicle 2 to detect an angle of rotation of the steering 8, i.e., a rudder angle of the steering 8 and output a signal to the controller 16 in accordance with the detected rudder angle. The wheel-turning amount sensor 12 includes a light-emitting diode, a slit board, and a phototransistor, for example. In the case where the wheel-turning amount sensor 12 has such a configuration, light emitted from the light-emitting diode is received or intercepted by the slit board rotating with rotation of a steering shaft, and an ON/OFF state of the phototransistor is switched to detect the rudder angle of the steering 8. It is assumed that when the steering 8 is turned in the clockwise direction in a state in which the vehicle 2 travels straight (a neutral state), the rudder angle becomes a positive value, and when the steering 8 is turned in the counterclockwise direction from the neutral state, the rudder angle becomes a negative value.

The wheel speed sensors 14 (14FL, 14RL, 14FR, 14RR) having the same construction are respectively fixed near rotors, not illustrated, which are rotated with the respective wheels 6 (6FL, 6RL, 6FR, 6RR). Each of the wheel speed sensors 14 detects a change of a magnetic field generated by rotation of a corresponding one of the rotors and outputs the detected change to the controller 16 as a velocity pulse. While the wheel speed sensors 14FL, 14RL are respectively provided on the front left wheel 6FL and the rear left wheel 6RL as illustrated in FIG. 1, the wheel speed sensors 14FR, 14RR are respectively provided on the front right wheel and the rear right wheel, not illustrated.

The controller 16 includes a CPU, a ROM, an EEPROM, a RAM, and a communication interface. The CPU executes various kinds of control by executing programs stored in the ROM. The wheel-turning amount sensor 12, the wheel speed sensors 14, the vehicle-mounted camera 18, a display 20 which will be described below, and the image display switch 22 are connected to the controller 16 such that these devices are communicable with the controller 16. The controller 16 creates an image to be displayed by cutting out a portion of an image taken by the vehicle-mounted camera 18. It is noted that the image taken by the vehicle-mounted camera 18 may be hereinafter referred to as "taken image". The controller 16 then displays the created image on the display 20. This image cutout processing for cutting out a portion of an image taken by the vehicle-mounted camera 18 is executed each time when a predetermined length of time is elapsed after the controller 16 receives an ON signal from the image display switch 22. The image cutout processing will be described later in detail.

The vehicle-mounted camera 18 is provided on a rear end portion of a roof portion of the vehicle 2 or on a rear end portion of the vehicle 2 to at least take an image in a visible light region. One example of the vehicle-mounted camera 18 is a CCD camera. The vehicle-mounted camera 18 takes an image representing a view behind the vehicle 2 and creates image data based on the image. The vehicle-mounted camera 18 transmits the created image data to the controller 16. The image taken by the vehicle-mounted camera 18 contains a lane behind the vehicle 2, for example.

The rear image display device 19 is mounted on the roof portion defining a passenger compartment. The rear image display device 19 is disposed in front of a driver's seat and between the driver's seat and an assistant-driver's seat. The rear image display device 19 includes the display 20, a mirror surface 21, and a frame 23. The mirror surface 21 has substantially the same size as the frame 23 and is fitted in the frame 23. The mirror surface 21 reflects a view behind the vehicle 2. The display 20 is formed in a portion of the mirror surface 21. The display 20 is smaller in size than the mirror surface 21 and disposed at substantially the center of the mirror surface (see FIG. 3C). That is, the mirror surface 21 includes: a mirror surface portion 21a formed on a surface of the display 20; and a mirror surface portion 21b located around the display 20. The display 20 displays an image based on image data created by the vehicle-mounted camera 18 and output from the controller 16.

In a state in which the display 20 is not operated, each of the mirror surface portion 21a and the mirror surface portion 21b serves as an optical mirror (a mirror-surface showing state). In a state in which the display 20 is being operated, the image is displayed on the display 20 and viewable by an occupant (a display showing state). In the case where the mirror surface portion 21a and the mirror surface portion 21b reflect a rear-side view in a state in which the image is displayed on the display 20 in the display showing state, a viewability of the image displayed on the display 20 is reduced. Thus, the angle of the frame 23 is adjusted in the display showing state such that the mirror surface 21 faces a ceiling of the vehicle 2 so as not to reflect the rear-side view.

The image display switch 22 is provided at a position at which the rear image display device 19 and the roof portion of the vehicle 2 are connected to each other. The image display switch 22 sends the controller 16 a signal for switching a display state (view showing state) of the rear image display device 19 between the mirror-surface showing state and the display showing state. An ON/OFF state of the image display switch 22 is switched by the occupant. When the image display switch 22 is switched to the ON state, the display state of the rear image display device 19 is switched from the mirror-surface showing state to the display showing state, and the image taken by the vehicle-mounted camera 18 is displayed on the display 20. When the image display switch 22 is switched to the OFF state, the display state of the rear image display device 19 is switched from the display showing state to the mirror-surface showing state, and the mirror surface 21 reflects the view behind the vehicle.

There will be described operations caused by the image cutout processing executed by the controller 16. A length of time t is required from a time point when an image is taken by the vehicle-mounted camera 18, to a time point when the image is displayed on the display 20 after the image cutout processing. Thus, in reality, the image being displayed on the display 20 is a cutout image that is cut out from the image taken by the camera 18 the time t before the time point at which the image currently displayed on the display 20 is displayed. Thus, image delay is caused. Accordingly, in the case where the orientation of the vehicle 2 is changed before the time t is elapsed from the taking of the image by the camera 18, the image taken before the change of the orientation of the vehicle 2 is displayed on the display 20 when the time t is elapsed, leading to discomfort given to a driver.

Figure 3A:
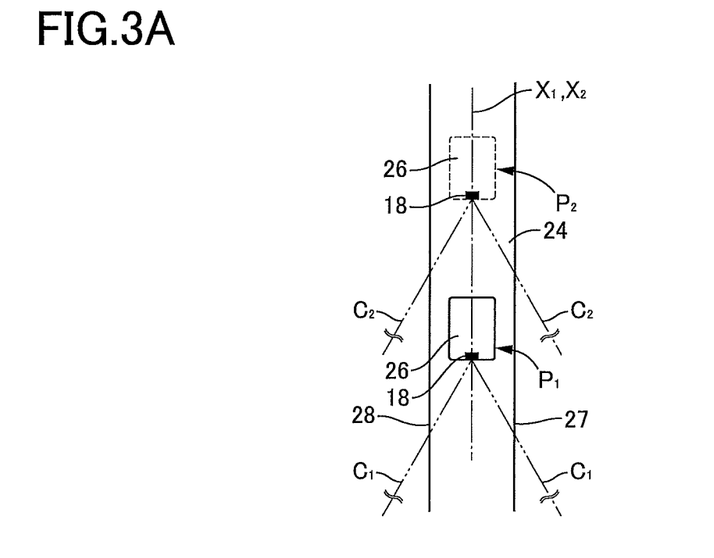
FIG. 3A is a view of a situation in which an own vehicle is driving on a straight lane, with the own vehicle viewed from above.
Figure 3B:
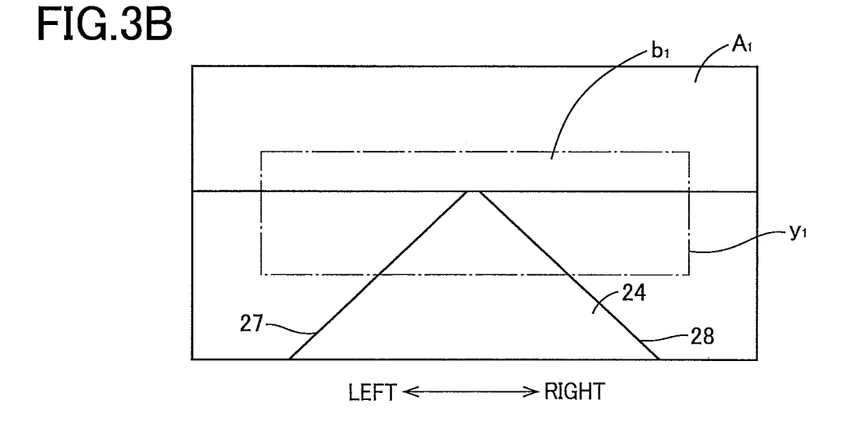
FIG. 3B is a view of an image taken by a camera, the image representing a view behind the own vehicle located at a vehicle position $P_1$ in FIG. 3A.
Figure 3C:
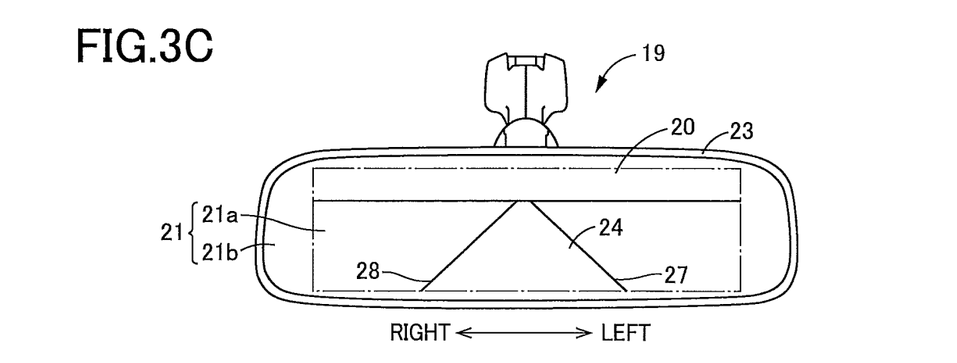

To solve this problem, the controller 16 calculates an amount of change of the orientation of the vehicle during a lapse of the time t and moves a cutout position in accordance with the calculated change amount such that the cutout image cut out from the image taken at the time point when the taken image is taken by the vehicle-mounted camera 18 becomes closer to a cutout image created when the time t is elapsed (noted that the cutout position is a position at which the cutout image is cut out from the taken image). For example, in the case where a display object is contained in the take image at the time point when the image is taken by the vehicle-mounted camera 18 but is not contained in the cutout image and where change of the orientation of the vehicle moves the display object in the taken image into the cutout image created at the time when the time t is elapsed, a cutout position for the taken image at the time point when the image is taken by the vehicle-mounted camera 18 is moved such that the display object is moved into the cutout image, whereby the cutout image identical to the cutout image at the time point when the time t is elapsed is cut out from the taken image at the time point when the image is taken by the vehicle-mounted camera 18, FIG. 3A is a view of a situation in which an own vehicle 26 driving on a straight lane 24, with the own vehicle 26 viewed from above. FIG. 3B is a view illustrating an image $A_1$ taken by the vehicle-mounted camera 18 at a vehicle position $P_1$ in FIG. 3A. FIG. 3C is a view of an image displayed on the display 20 when the own vehicle 26 is located at a vehicle position $P_2$ in FIG. 3A. In FIG. 3A, the vehicle position $P_2$ indicates a position of the own vehicle 26 at the time point when the time t is elapsed from the timing when the own vehicle 26 is located at the vehicle position $P_1$. The time t is a length of time extending from the time point when the image is taken by the vehicle-mounted camera 18 to the time point when the cutout image is displayed on the display 20. The lane 24 is defined by an inner dividing line 27 and an outer dividing line 28. The one-dot chain line indicates longitudinal axes $X_1$, $X_2$ each extending in the longitudinal direction of the own vehicle 26. The two-dot chain lines indicate boundaries $C_1$, $C_2$ of shooting areas of the vehicle-mounted camera 18. That is, each of an area between the two boundaries $C_1$ and an area between the two boundaries $C_2$ is the shooting area of the vehicle-mounted camera 18.

It is noted that FIG. 3A illustrates the vehicle position $P_1$ and the vehicle position $P_2$ at a large distance therebetween in order to clarify change of the orientation of the vehicle between the orientation of the own vehicle 26 located at the vehicle position $P_1$ and the orientation of the own vehicle 26 located at the vehicle position $P_2$. In actual control, however, the vehicle position $P_1$ and the vehicle position $P_2$ are spaced apart from each other at a considerably short distance. Also, the time t required for the own vehicle 26 to move from the vehicle position $P_1$ to the vehicle position $P_2$ is considerably short, for example, the time t is less than 0.1 second. The time t is one example of a first period.

In FIG. 3B, the one-dot chain lines indicate a cutout frame $y_1$ for a cutout image $b_1$ that is cut out based on a reference cutout position. The reference cutout position is a cutout position set in the taken image $A_1$ in advance and set at substantially the center of the taken image $A_1$. The cutout image $b_1$ is a portion of the taken image $A_1$ and cut out from the taken image $A_1$ to create an image to be displayed on the display 20. The cutout frame $y_1$ is a frame indicating an area in which the cutout image $b_1$ is cut out from the taken image $A_1$. In the taken image $A_1$, it is assumed that a direction directed from the inner dividing line 27 toward the outer dividing line 28 in the lateral direction (the X-axis direction) in the taken image $A_1$ is a right direction, and a direction directed from the outer dividing line 28 toward the inner dividing line 27 is a left direction.

In the lateral direction of the display 20 (i.e., a direction parallel with the widthwise direction of the own vehicle 26) in FIG. 3C, it is assumed that a direction directed from the inner dividing line 27 toward the outer dividing line 28 displayed on the display 20 is a right direction, and a direction directed from the outer dividing line 28 toward the inner dividing line 27 is a left direction. That is, the image displayed on the display 20 is created by flipping the cutout image horizontally.

When the signal output from the image display switch 22 is the ON signal, the vehicle-mounted camera 18 takes an image. The vehicle-mounted camera 18 is fixed so as to always take an image right behind the own vehicle 26. Thus, in the case where the own vehicle 26 is driving on the straight lane 24, as illustrated in FIG. 3B the controller 16 receives an image in which the lane 24 is located at substantially the center of the taken image $A_1$.

The controller 16 then executes the image cutout processing based on the received taken image $A_1$. The controller 16 sets the cutout frame $y_1$ to the reference cutout position in FIG. 3B, cuts out an image enclosed with the set cutout frame $y_1$, as the cutout image $b_1$ and creates an image to be displayed by flipping the cutout image $b_1$ relative to the X-axis direction (i.e., a lateral flip of the cutout image $b_1$). The controller 16 outputs a signal based on the created image to the display 20. The cutout image $b_1$ is displayed on the display 20 when the time t is elapsed from the time point at which the taken image $A_1$ is taken by the vehicle-mounted camera 18. That is, an image created based on the cutout image $b_1$ cut out from the taken image $A_1$ when the own vehicle 26 is located at the vehicle position $P_1$ is displayed on the display 20 formed on an inner mirror 10 as illustrated in FIG. 3O when the own vehicle 26 is located at the vehicle position $P_2$.

When the own vehicle 26 is driving at the vehicle position $P_1$ on the straight lane 24, it is estimated that the orientation of the own vehicle 26 is not to be changed during driving of the own vehicle 26 from the vehicle position $P_1$ to the vehicle position $P_2$. Since the lane 24 does not move in the taken image at this time, discomfort caused by the image delay is not given to the driver. Accordingly, the controller 16 sets the cutout position in the taken image $A_1$, as the reference cutout position.

Figure 4A:
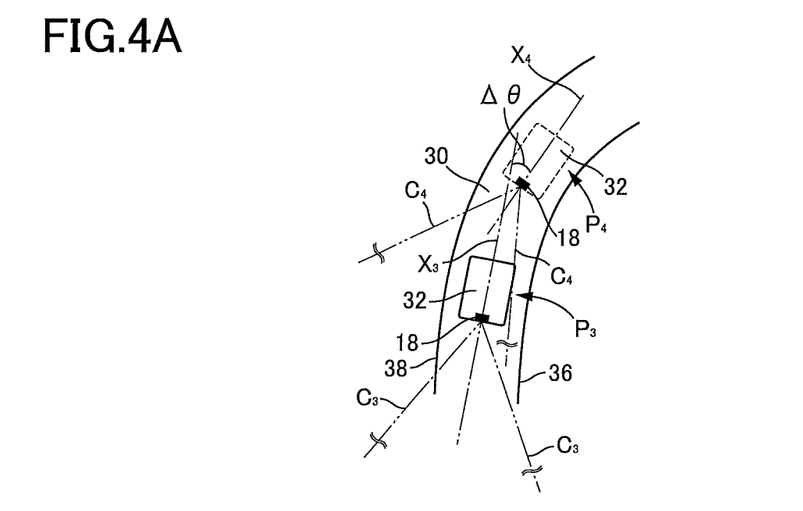
FIG. 4A is a view of a situation in which an own vehicle is driving on a curve, with the own vehicle viewed from above.
Figure 4B:
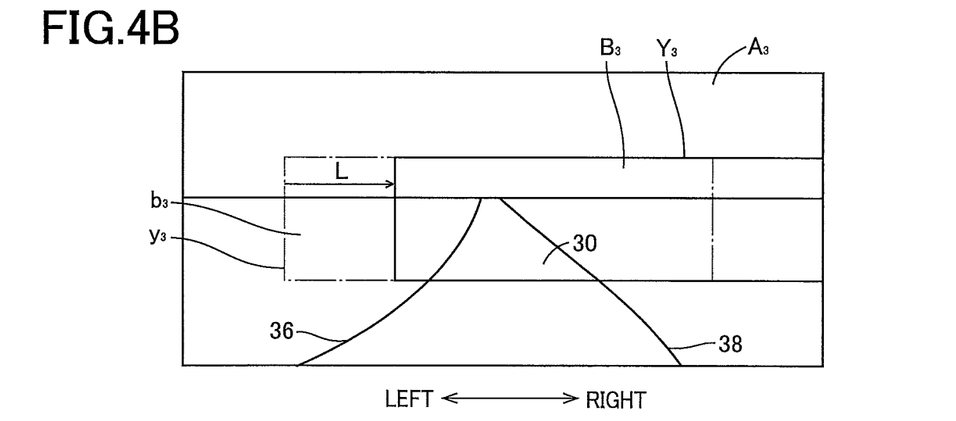
FIG. 4B is a view of an image taken by a camera, the image representing a view behind the own vehicle located at a vehicle position $P_3$ in FIG. 4A.
Figure 4C:
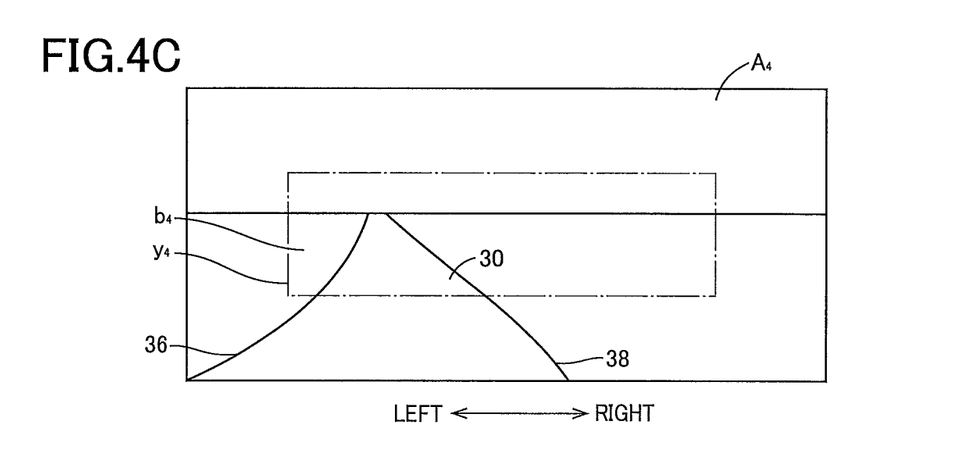

FIG. 4A is a view of a situation in which an own vehicle 32 is driving on a curve 30, with the own vehicle 32 viewed from above. FIG. 4B is a view of an image $A_3$ taken by the vehicle-mounted camera 18 when the own vehicle 32 is located at a vehicle position $P_3$ in FIG. 4A. FIG. 4C is a view of an image $A_4$ taken by the vehicle-mounted camera 18 when the own vehicle 32 is located at a vehicle position $P_4$ in FIG. 4A. In FIG. 4A, the vehicle position $P_4$ indicates a position of the own vehicle 32 at the time point when the time t is elapsed from the timing when the own vehicle 32 is located at the vehicle position $P_3$. The time t is a length of time extending from the time point when the image is taken by the vehicle-mounted camera 18 to the time point when the cutout image is displayed on the display 20. The one-dot chain lines respectively indicate longitudinal axes $X_3$, $X_4$ of the own vehicle 32. The two-dot chain lines indicate boundaries $C_3$, $C_4$ of shooting areas of the vehicle-mounted camera 18. The curve 30 is defined by (i) an inner dividing line 36 defining an inner side of the curve and (ii) an outer dividing line 38 defining an outer side of the curve.

It is noted that FIG. 4A illustrates the vehicle position $P_3$ and the vehicle position $P_4$ at a large distance therebetween in order to clarify an amount $\Delta\theta$ of change of the orientation of the vehicle between the orientation of the own vehicle 32 located at the vehicle position $P_3$ and the orientation of the own vehicle 32 located at the vehicle position $P_4$. In actual control, however, the vehicle position $P_3$ and the vehicle position $P_4$ are spaced apart from each other at a considerably short distance. Also, the time t required for the own vehicle 32 to move from the vehicle position $P_3$ to the vehicle position $P_4$ is considerably short, for example, the time t is less than 0.1 second. The time t is one example of the first period.

In FIG. 4B, the one-dot chain lines indicate a cutout frame $y_3$ for a cutout image $b_3$ that is cut out based on the reference cutout position in the taken image $A_3$ when the own vehicle 32 is located at the vehicle position $P_3$. In the image $A_3$ taken by the vehicle-mounted camera 18, it is assumed that a direction directed from the inner dividing line 36 toward the outer dividing line 38 (i.e., a direction directed from an inner side of the curve 30 toward an outer side of the curve 30) in the lateral direction (i.e., the X-axis direction) of the taken image is defined as the right direction, and a direction directed from the outer dividing line 38 toward the inner dividing line 36 (i.e., a direction directed from the outer side of the curve 30 toward the inner side of the curve 30) in the lateral direction of the taken image is defined as the left direction.

When the own vehicle 32 is located at the vehicle position $P_3$, as illustrated in FIG. 4B, the curve 30 located behind the own vehicle 32 is located at substantially the center of the taken image $A_3$. Since the own vehicle 32 is driving on the curve 30 at the vehicle position $P_3$, it is estimated that the orientation of the own vehicle 32 is to be changed by an amount $\Delta\theta$ during movement of the own vehicle 32 from the vehicle position $P_3$ to the vehicle position $P_4$. When the orientation of the own vehicle 32 is changed by the amount $\Delta\theta$, the vehicle-mounted camera 18 takes an image mainly representing an outer side of the curve behind the own vehicle 32 as illustrated in FIG. 4O. In the taken image $A_4$ taken when the own vehicle 32 is located at the vehicle position $P_4$, in this case, the curve 30 is located to the left of substantially the center of the taken image $A_4$.

Thus, the curve 30 moves leftward in the taken image during a lapse of the time t. In the case where the curve 30 moves by a large distance, the image delay easily causes discomfort to the driver. To reduce the discomfort caused by the image delay, the controller 16 estimates that the curve 30 is to move leftward in the taken image with change of the orientation of the own vehicle 32, and the controller 16 moves the cutout frame $Y_3$ rightward from the reference cutout position in the taken image $A_3$.

There will be explained a distance L of movement of the cutout frame $Y_3$ from the reference cutout position (noted that the distance L may be hereinafter referred to as "moving distance L"). First, the controller 16 obtains the rudder angle and the speed of the own vehicle 32 located at the vehicle position $P_3$. The controller 16 then calculates, based on the obtained rudder angle and speed of the own vehicle 32, an amount $\Delta\theta$ of change of the orientation of the own vehicle 32, which change is caused in the case where the own vehicle 32 is moved from the vehicle position $P_3$ to the vehicle position $P_4$. The amount $\Delta\theta$ of change of the orientation of the own vehicle 32 may be obtained by a mathematical relationship among the rudder angle and the speed of the own vehicle 32 located at the vehicle position $P_3$, the wheelbase of the own vehicle 32, and the time t. The controller 16 then calculates a distance L of movement of the cutout frame $Y_3$ in the taken image $A_3$. The moving distance L is a distance by which the cutout frame $Y_3$ is to be moved from the reference cutout position in the taken image $A_3$. The cutout frame $Y_3$ is moved from the reference cutout position by the moving distance L, and the cutout image $B_3$ is cut out based on the moved cutout frame $Y_3$.

Here, there will be explained a method of calculating the moving distance L based on the amount $\Delta\theta$ of change of the orientation of the own vehicle 32. A correlation between the amount $\Delta\theta$ of change of the orientation and the moving distance L is calculated as follows, for example. An object is placed behind the vehicle 2 at a predetermined distance from the vehicle 2. For example, this predetermined distance is set to a distance established when the object is located at substantially the center of the taken image in the right and left direction and the up and down direction. The orientation of the vehicle 2 is changed gradually in this state, and both of the magnitude of the amount of change of the orientation of the vehicle and the magnitude of a distance of movement of the object in the taken image are measured, thereby obtaining a correlation between the magnitude of the amount of change of the orientation of the vehicle and a distance of movement of the shooting area of the vehicle-mounted camera 18 with respect to the taken image. Since the cutout frame is moved by the distance of movement of the shooting area of the vehicle-mounted camera 18, this correlation is also established between the amount $\Delta\theta$ of change of the orientation of the vehicle 2 and the distance L of movement of the cutout frame. It is noted that the distance L of movement of the cutout frame is greater when the amount $\Delta\theta$ of change of the orientation of the vehicle 2 is large than when the amount $\Delta\theta$ of change of the orientation of the vehicle 2 is small.

As described above, the controller 16 preliminarily calculates a correlation between the amount $\Delta\theta$ of change of the orientation of the own vehicle 32 and the distance L of movement of the cutout frame $Y_3$. The controller 16 calculates the distance L of movement of the cutout frame $Y_3$ with respect to the amount $\Delta\theta$ of change of the orientation of the own vehicle 32, from this correlation and the amount $\Delta\theta$ of change of the orientation of the own vehicle 32. The controller 16 moves the cutout frame $Y_3$ in the taken image $A_3$ in the right direction, i.e., toward the outer side of the curve, by the moving distance L calculated from the reference cutout position. The controller 16 cuts out the cutout image $B_3$ from the taken image $A_3$ based on the moved cutout frame $Y_3$, and creates an image to be displayed by executing a mirror-image processing for the cutout image $B_3$ relative to the X-axis direction. Due to the image delay, the cutout image is displayed on the display 20 when the time t is elapsed from the timing when the taken image $A_3$ is taken by the vehicle-mounted camera 18. That is, an image created based on the cutout image $B_3$ cut out from the image $A_3$ taken when the own vehicle 32 is located at the vehicle position $P_3$ is displayed on the display 20 when the own vehicle 32 is located at the vehicle position $P_4$.

Figure 5A:
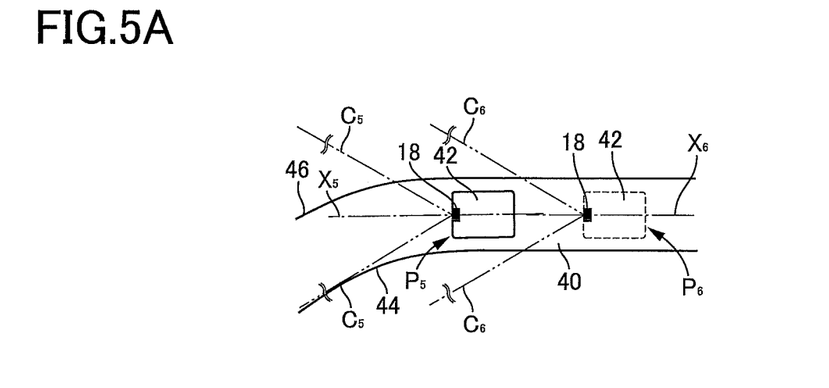
FIG. 5A is a view of a situation in which an own vehicle is driving on a road partly including a curve, with the own vehicle viewed from above.
Figure 5B:
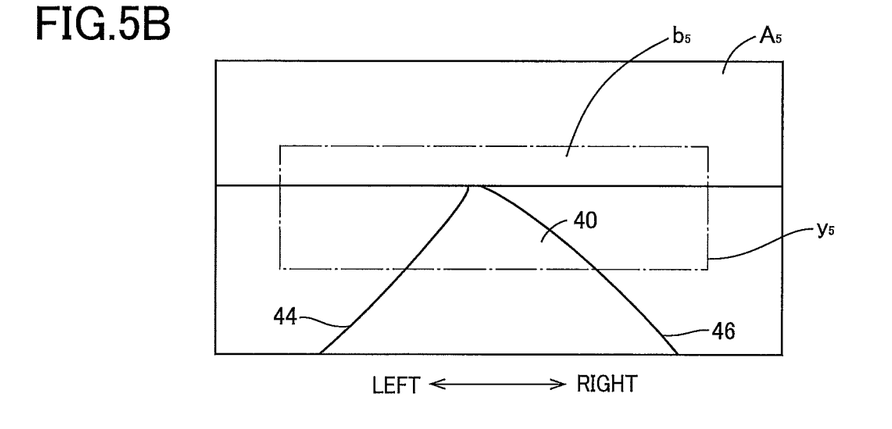
FIG. 5B is a view of an image taken by a camera, the image representing a view behind the own vehicle located at a vehicle position $P_5$ in FIG. 5A.
Figure 5C:
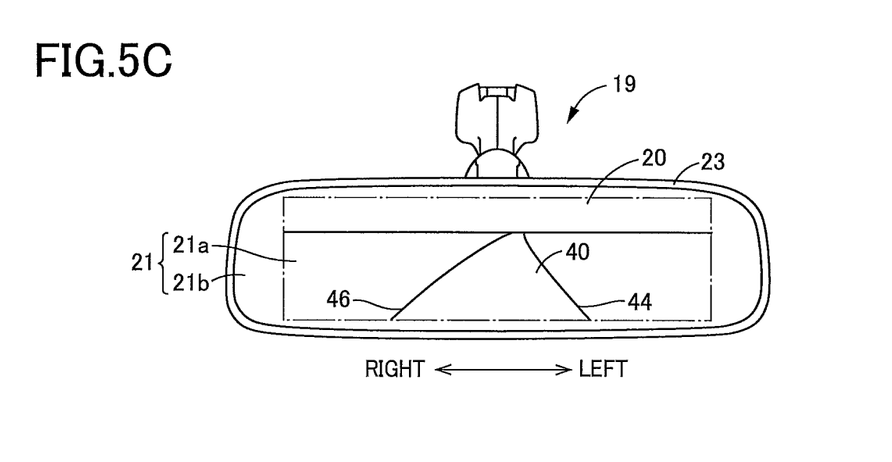
FIG. 5C is a view of an image reflected in the inner mirror when the own vehicle is located at a vehicle position $P_6$ in FIG. 5A.

FIG. 5A is a view of a situation in which an own vehicle 42 is driving on a lane 40 after passing through a curve of the lane 40, with the own vehicle viewed from above. FIG. 5B is a view of an image $A_5$ taken by the vehicle-mounted camera 18 when the own vehicle 42 is located at a vehicle position $P_5$ in FIG. 5A. FIG. 5C is a view of an image displayed on the display 20 when the own vehicle 42 is located at a vehicle position $P_6$ in FIG. 5A. In FIG. 5A, the vehicle position $P_6$ indicates a position of the own vehicle 42 at the time point when the time t is elapsed from the timing when the own vehicle 42 is located at the vehicle position $P_5$. The time t is a length of time extending from the time point when the image is taken by the vehicle-mounted camera 18 to the time point when the cutout image is displayed on the display 20. The one-dot chain line indicates the longitudinal axes $X_5$, $X_6$ of the own vehicle 42 when the own vehicle 42 is located at the vehicle positions $P_5$, $P_6$, respectively. The two-dot chain lines indicate boundaries $C_5$, $C_6$ of the shooting area of the vehicle mounted camera 18 when the own vehicle 42 is located at the vehicle positions $P_5$, $P_6$, respectively. The lane 40 is defined by an inner dividing line 44 and an outer dividing line 46.

In FIG. 5B, the one-dot chain line indicates a cutout frame $y_5$ for a cutout image $b_5$ that is cut out based on the reference cutout position. In the taken image $A_5$, it is assumed that a direction directed from the inner dividing line 44 toward the outer dividing line 46 in the lateral direction (i.e., the X-axis direction) of the taken image $A_5$ is defined as the right direction, and a direction directed from the outer dividing line 46 toward the inner dividing line 44 in the lateral direction is defined as the left direction. In FIG. 5C, it is assumed that a direction directed from the inner dividing line 44 toward the outer dividing line 46 in the lateral direction of the display 20 (i.e., a direction parallel with the widthwise direction of the own vehicle 42) is defined as the right direction, and a direction directed from the outer dividing line 46 toward the inner dividing line 44 in the lateral direction is defined as the left direction. That is, the image displayed on the display 20 is created by executing the mirror-image processing for the cutout image horizontally.

In the case where the own vehicle 42 is driving on an end portion of the curve of the lane 40 (that is, the own vehicle 42 is located at the vehicle position $P_5$), as illustrated in FIG. 5B, the controller 16 obtains an image in which the lane 40 is located at substantially the center of the taken image $A_5$ or located slightly to the left of substantially the center of the taken image $A_5$. The controller 16 then executes the image cutout processing based on the obtained image $A_5$. Since the own vehicle 42 has already passed through the curve, it is estimated that the orientation of the own vehicle 42 is not to be changed during movement of the own vehicle 42 from the vehicle position $P_5$ to the vehicle position $P_6$. In this movement, the lane 40 in the taken image does not move in the taken image, resulting in reduced discomfort caused by image delay. Accordingly, the controller 16 sets the cutout frame $y_5$ in the taken image $A_5$, as the reference cutout position.

The controller 16 then cuts out the cutout image $b_5$ from the taken image $A_5$ based on the cutout frame $y_5$ located at the reference cutout position, and creates an image to be displayed by flipping the cutout image $h_5$ relative to the X-axis direction. The controller 16 sends the display 20 a signal based on the image to be displayed. The display 20 displays the image when the time t is elapsed from the timing when the taken image $A_5$ is taken by the vehicle-mounted camera 18. That is, an image created based on the cutout image $b_5$ cut out from the image $A_5$ taken when the own vehicle 42 is located at the vehicle position $P_5$ is displayed on the display 20 when the own vehicle 42 is located at the vehicle position $P_6$.

As described above, the change of the cutout position in the image cutout processing executed by the controller 16 is executed when it is estimated that the orientation of the vehicle 2 is to be changed after the lapse of the time t by driving of the vehicle 2 on the curve, for example. In this change, the cutout position for the cutout frame $Y_3$ is moved from the reference cutout position in a direction directed from the inner dividing line 36 toward the outer dividing line 38 in the taken image $A_3$ (i.e., in a direction toward the outer side of the curve). When it is estimated that the vehicle 2 is driving on the straight portion, and thereby its orientation is not to be changed, the controller 16 determines the cutout position for the cutout frame to the reference cutout position.

Figure 6:
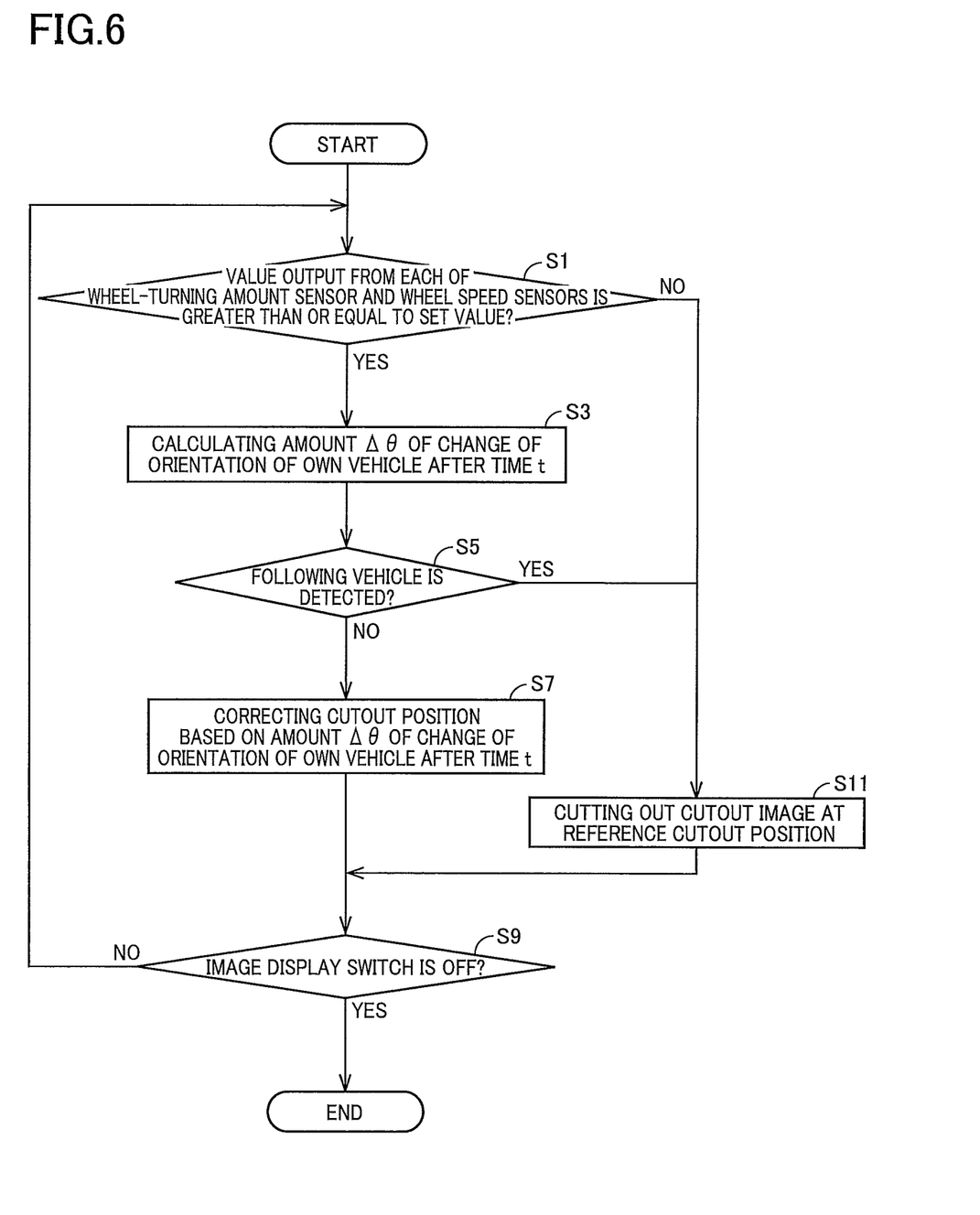
FIG. 6 is a flow chart illustrating an image cutout processing executed by the controller in the first embodiment.

There will be described a flow of the image cutout processing executed by the controller 16 with reference to the flow chart in FIG. 6. This flow begins when the vehicle 2 is actuated in a state in which the image display switch 22 is ON or when the image display switch 22 is turned to ON. From the timing just after the image cutout processing is started, the controller 16 obtains an image taken by the vehicle-mounted camera 18 each time when a predetermined length of time is elapsed.

This flow begins with S1 at which the controller 16 receives signals from the wheel-turning amount sensor 12 and the wheel speed sensors 14 of the own vehicle 32 located at the vehicle position $P_3$ and determines whether a value output from each of the sensors is greater than or equal to a corresponding set value. When the value output from each of the wheel-turning amount sensor 12 and the wheel speed sensors 14 is greater than or equal to the set value, this flow goes to S3. When the value output from at least one of the wheel-turning amount sensor 12 and each of the wheel speed sensors 14 is less than the set value, this flow goes to S11.

The controller 16 at S3 calculates an amount $\Delta\theta$ of change of the orientation of the own vehicle 32 from the timing when the own vehicle 32 is located at the vehicle position $P_3$ to the timing when the own vehicle 32 is located at the vehicle position $P_4$ (within the time t). For example, when the own vehicle 32 is located at the vehicle position $P_3$ in FIG. 4A, the controller 16 obtains the rudder angle and the speed of the own vehicle 32 based on the values output from the wheel-turning amount sensor 12 and the wheel speed sensors 14 of the own vehicle 32 located at the vehicle position $P_3$. The controller 16 calculates, based on the obtained rudder angle and speed of the own vehicle 32 and the time t, an amount $\Delta\theta$ of change of the orientation of the own vehicle 32, which change is to be caused when the own vehicle 32 is moved from the vehicle position $P_3$ to the vehicle position $P_4$. The controller 16 at S5 determines whether a following vehicle is detected in the image $A_3$ taken by the vehicle-mounted camera 18 when the own vehicle 32 is located at the vehicle position $P_3$. When the following vehicle is not detected in the taken image $A_3$, this flow goes to S7. When the following vehicle is detected, this flow goes to S11.

The controller 16 at S7 calculates the distance L of movement of the cutout frame $Y_3$, based on the amount $\Delta\theta$ of change of the orientation of the own vehicle 32 which is calculated at S3 and on the preliminarily calculated correlation between the amount $\Delta\theta$ of change of the orientation of the own vehicle 32 and the distance L of movement of the cutout frame $Y_3$. The controller 16 then moves the cutout position for the cutout frame $Y_3$ from the reference cutout position by the moving distance L. The direction in which the cutout frame $Y_3$ is to be moved is determined based on whether the value of the rudder angle of the own vehicle 32 at the vehicle position $P_3$ which is obtained in at S3 is positive or negative. The controller 16 moves the cutout frame $Y_3$ in the right direction in the taken image $A_3$ when the value of the rudder angle is positive, that is, when the own vehicle 32 is driving on a right curve, and a display object in the taken image is moved in a direction directed from the outside of the curve toward the inside of the curve (i.e., the left direction). The controller 16 moves the cutout frame $Y_3$ in the left direction in the taken image $A_3$ when the value of the rudder angle is negative, that is, when the own vehicle 32 is driving on a left curve, and the display object in the taken image is moved in a direction directed from the inside of the curve toward the outside of the curve (i.e., the right direction).

The controller 16 then cuts out the cutout image $B_3$ based on the moved cutout frame $Y_3$, creates an image to be displayed by flipping the cutout image $B_3$ relative to the X-axis direction, and sends the display 20 a signal based on the image to be displayed. The controller 16 at S9 determines whether the signal output from the image display switch 22 is an OFF signal. When the signal output from the image display switch 22 is the OFF signal, this flow ends. When the signal output from the image display switch 22 is not the OFF signal, this flow returns to S1. When a negative decision (NO) is made at S1, or a positive decision (YES) is made at S5, the controller 16 at S11 cuts out the cutout image $b_3$ based on the cutout frame $y_3$ set at the reference cutout position located at substantially the center of the taken image. The controller 16 creates an image to be displayed by executing the mirror-image processing for the cutout image $b_3$ relative to the X-axis direction and sends the display 20 a signal based on the image to be displayed, and this flow goes to S9.

In the image display device 4 configured as described above, the display object in the taken image is to be moved in the right and left direction due to change of the orientation of the own vehicle 32, the shooting area of the vehicle-mounted camera 18 moves with respect to the taken image in a direction opposite to a direction of the movement of the display object. For example, in the case where the display object moves leftward in the taken image, the shooting area of the vehicle-mounted camera 18 moves rightward with respect to the taken image. Thus, a portion of the taken image $A_3$ which is located to the right of the cutout frame $Y_3$ located at the reference cutout position in FIG. 4B is contained in a cutout image $b_4$ that is cut out from the taken image $A_4$ at the reference cutout position at the time point when the own vehicle 32 is driving at the vehicle position $P_4$, which time point is later than the time point when the own vehicle 32 is driving at the vehicle position $P_3$. In the present embodiment, in the case where the display object in the cutout frame $Y_3$ is to move due to change of the orientation of the own vehicle 32, the controller 16 calculates the distance L of movement of the cutout frame $Y_3$ based on the amount $\Delta\theta$ of change of the orientation of the own vehicle 32 and moves the cutout frame $Y_3$ in the taken image $A_3$ by the moving distance L. As a result, the cutout image $b_4$ to be cut out at the reference cutout position after the change of the orientation of the own vehicle 32 can be cut out from the image $A_3$ taken before the change of the orientation of the own vehicle 32.

In the present embodiment, the time t is required from the time point when the controller 16 cuts out the cutout image $B_3$ from the image $A_3$ taken by the vehicle-mounted camera 18 during driving of the own vehicle 32 at the vehicle position $P_3$ in FIG. 4A, to the time point when the cutout image $B_3$ is displayed on the display 20. Thus, the cutout image $B_3$ cut out from the taken image $A_3$ is displayed on the display 20 at the time point when the own vehicle 32 is driving at the vehicle position $P_4$ the time t after the own vehicle 32 drives at the vehicle position $P_3$. This time t is a delay time caused by various processings. Even in the case where such a delay time has occurred, the cutout frame $Y_3$ in the taken image $A_3$ is moved from the reference cutout position in a direction opposite to the direction of the movement of the display object, whereby the cutout image $B_3$ at the time point when the own vehicle 32 is driving at the vehicle position $P_4$, which time point is later than the time point when the own vehicle 32 is driving at the vehicle position $P_3$, can be displayed on the display 20 when the time t is elapsed.

When the own vehicle 32 is driving on the curve 30, the orientation of the own vehicle 32 is changed, so that the shooting area of the vehicle-mounted camera 18 moves rightward with respect to the display object. Thus, the curve 30 located behind the own vehicle 32 moves leftward in the taken image. In this case, the cutout position is moved rightward in the taken image $A_3$ when the own vehicle 32 is located at the vehicle position $P_3$, whereby the cutout image $B_3$ identical to the cutout image to be created after the own vehicle 32 drives at the vehicle position $P_3$ can be cut out from the taken image $A_3$.

When the orientation of the own vehicle 32 is changed due to driving of the own vehicle 32 on the curve 30, the vehicle-mounted camera 18 takes an image representing a larger area outside the curve with the change of the orientation of the own vehicle 32. In this case, the cutout frame $Y_3$ in the taken image $A_3$ at the vehicle position $P_3$ is moved from the reference cutout position in the direction directed toward the outside of the curve, whereby the cutout image $B_3$ identical to the cutout image to be created after the own vehicle 32 drives at the vehicle position $P_3$ can be cut out from the taken image $A_3$. This processing reduces discomfort which is caused when the cutout image $B_3$ created when the own vehicle 32 is driving at the vehicle position $P_3$ is displayed on the display 20 when the own vehicle 32 is driving at the vehicle position $P_4$.

In the present embodiment, the controller 16 calculates the distance L of movement of the cutout frame $Y_3$ in the taken image $A_3$, based on the amount $\Delta\theta$ of change of the orientation of the own vehicle 32 from the timing when the own vehicle 32 is located at the vehicle position $P_3$ to the timing when the own vehicle 32 is located at the vehicle position $P_4$. With this processing, the cutout frame $Y_3$ can be moved by the distance of movement of the curve 30 located behind the own vehicle 32 in the taken image. Accordingly, the cutout image $B_3$ identical to the cutout image $b_4$ to be created when the own vehicle 32 is driving at the vehicle position $P_4$ can be cut out from the taken image $A_3$.

Since the rudder angle and the vehicle speed of the own vehicle 32 are detected, the controller 16 can detect that the own vehicle 32 is driving on the curve 30. When the own vehicle 32 is driving on the curve 30, the orientation of the own vehicle 32 is changed, causing the curve 30 in the taken image to move in the direction directed from the outside of the curve toward the inside of the curve. In the present embodiment, the cutout frame $Y_3$ in the taken image $A_3$ at the time point when the own vehicle 32 is driving at the vehicle position $P_3$ is moved in the direction directed from the inside of the curve toward the outside of the curve, whereby the cutout image $b_4$ at the time point when the own vehicle 32 is driving at the vehicle position $P_4$, which time point is later than the time point when the own vehicle 32 is driving at the vehicle position $P_3$, can be cut out from the taken image $A_3$.

First Modification

Figure 7:
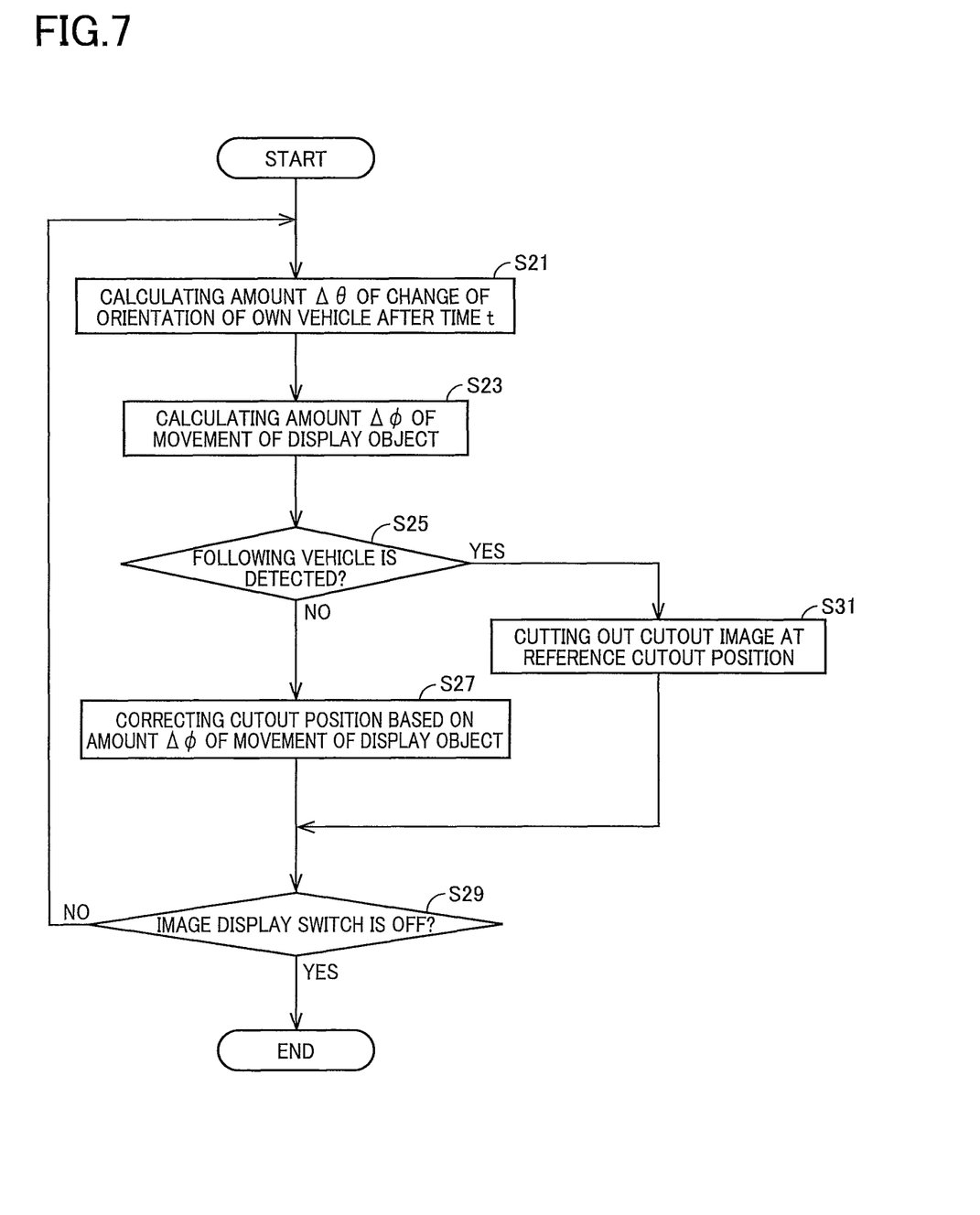
FIG. 7 is a flow chart illustrating an image cutout processing executed by the controller in a first modification of the first embodiment.

There will be described a first modification of the first embodiment. It is noted that an image display device according to the present modification is similar in configuration to the image display device 4 according to the first embodiment, and an explanation thereof is dispensed with. In the present modification, the controller 16 changes the cutout position in the taken image based on an amount of movement of the display object in the taken image, which movement is caused by change of the orientation of the vehicle 2. FIG. 7 illustrates a flow chart representing an image cutout processing executed by the controller 16. This flow begins when the vehicle 2 is actuated in the state in which the image display switch 22 is ON or when the image display switch 22 is turned to ON. From the timing just after the image cutout processing is started, the controller 16 obtains an image taken by the vehicle-mounted camera 18 each time when a predetermined length of time is elapsed.

This flow begins with S21 at which the controller 16 calculates an amount $\Delta\theta$ of change of the orientation of the vehicle 2 from the time point when the own vehicle 32 is driving at the vehicle position $P_3$ in FIG. 4A to the time point when the own vehicle 32 is driving at the vehicle position $P_4$ (that is, when the time t is elapsed). The time t is a length of time extending from the time point when the image $A_3$ is taken by the vehicle-mounted camera 18 to the time point when the cutout image $B_3$ is displayed on the display 20. The controller 16 obtains the rudder angle and the speed of the own vehicle 32 based on the values output from the wheel-turning amount sensor 12 and the wheel speed sensors 14 of the own vehicle 32 located at the vehicle position $P_3$. The controller 16 calculates, based on the obtained rudder angle and speed of the own vehicle 32 and the time t, an amount $\Delta\theta$ of change of the orientation of the vehicle 2, which change is caused from the time point when the own vehicle 32 is driving at the vehicle position $P_3$ to the time point when the own vehicle 32 is driving at the vehicle position $P_4$.

At S23, the controller 16 calculates an amount $\Delta\varphi$ of movement of the display object in the taken image within the time t extending from the time point when the own vehicle 32 is driving at the vehicle position $P_3$ to the time point when the own vehicle 32 is driving at the vehicle position $P_4$, based on the amount $\Delta\theta$ of change of the orientation of the own vehicle 32 which is calculated at S21 and on the preliminarily obtained correlation (i.e., the relationship between the amount $\Delta\theta$ of change of the orientation of the own vehicle 32 and an amount $\Delta\varphi$ of movement of the display object in the taken image). The correlation between the amount $\Delta\theta$ of change of the orientation of the own vehicle 32 and the amount $\Delta\varphi$ of movement of the display object is calculated as follows, for example. A display object is placed behind the vehicle 2 at a predetermined distance from the vehicle 2. For example, this predetermined distance is set to a distance established when the display object is located at substantially the center of the taken image in the right and left direction and the up and down direction. The orientation of the vehicle 2 is changed gradually in this state, and both of the magnitude of the amount of change of the orientation of the vehicle 2 and the magnitude of an amount of movement of the display object in the taken image are measured, thereby obtaining a correlation between the amount $\Delta\theta$ of change of the orientation of the own vehicle 32 and the amount $\Delta\varphi$ of movement of the display object in the taken image.

At S25, the controller 16 determines whether a following vehicle is detected in the image $A_3$ taken by the vehicle-mounted camera 18. When no following vehicle is detected in the taken image, this flow goes to S27. When the following vehicle is detected, this flow goes to S31. At S27, the controller 16 determines the amount $\Delta\varphi$ of movement of the display object which is calculated at S21, as the distance L of movement of the cutout frame $Y_3$ and moves the cutout frame $Y_3$ from the reference cutout position by the moving distance L. The direction in which the cutout frame $Y_3$ is to be moved is determined based on whether the value of the rudder angle of the own vehicle 32 which is obtained in at S21 is positive or negative. The controller 16 moves the cutout frame $Y_3$ in the right direction in the taken image $A_3$ when the value of the rudder angle is positive, that is, when the display object in the taken image is moved in the left direction. The controller 16 moves the cutout frame $Y_3$ in the left direction in the taken image $A_3$ when the value of the rudder angle is negative, that is, when the display object in the taken image is moved in the right direction. The controller 16 then cuts out the cutout image $B_3$ based on the moved cutout frame $Y_3$, creates an image to be displayed by executing the mirror-image processing for the cutout image $B_3$ horizontally, and sends the display 20 a signal based on the image to be displayed.

The controller 16 at S29 determines whether the signal output from the image display switch 22 is an OFF signal. When the signal output from the image display switch 22 is the OFF signal, this flow ends. When the signal output from the image display switch 22 is not the OFF signal, this flow returns to 321. When a negative decision (NO) is made at S25, the controller 16 at S31 cuts out the cutout image $b_3$ based on the cutout frame $y_3$ set at the reference cutout position located substantially the center of the taken image $A_3$. The controller 16 then creates an image to be displayed by executing the mirror-image processing for the cutout image horizontally and sends the display 20 a signal based on the image to be displayed, and this flow goes to 329.

In the image display device configured as described above, the display object in the taken image is to be moved in the right and left direction due to change of the orientation of the own vehicle 32, the shooting area of the vehicle-mounted camera 18 moves with respect to the taken image in a direction opposite to a direction of the movement of the display object. For example, in the case where the display object moves leftward in the taken image $A_3$, the shooting area of the vehicle-mounted camera 18 moves rightward with respect to the taken image $A_3$. Thus, a portion of the taken image $A_3$ which is located to the right of the cutout frame $Y_3$ located at the reference cutout position in FIG. 4B is contained in the cutout image $b_4$ that is cut out from the taken image $A_4$ at the reference cutout position at the time point when the own vehicle 32 is driving at the vehicle position $P_4$, which time point is later than the time point when the own vehicle 32 is driving at the vehicle position $P_3$. In the present embodiment, the controller 16 estimates that the display object in the taken image $A_3$ is to move due to the change of the orientation of the own vehicle 32, calculates the distance L of movement of the cutout frame $Y_3$ based on the amount $\Delta\theta$ of change of the orientation of the own vehicle 32, and moves the cutout frame $Y_3$ in the taken image $A_3$ by the moving distance L. As a result, the cutout image $b_4$ to be cut out at the reference cutout position after the change of the orientation of the own vehicle 32 can be cut out from the image $A_3$ taken before the change of the orientation of the own vehicle 32.

In the present modification, the controller 16 preliminarily obtains the correlation between the amount $\Delta\theta$ of change of the orientation of the own vehicle 32 and the amount $\Delta\varphi$ of movement of the display object in the taken image, enabling the controller 16 to calculate the distance L of movement of the cutout frame $Y_3$ based on the correlation and the amount $\Delta\theta$ of change of the orientation of the own vehicle 32.

In the first embodiment and the first modification, each of the taken images $A_1$, and $A_3$-$A_5$ is one example of a first image, and each of the cutout images $b_1$, $B_3$, $b_4$, and $b_5$ is one example of a second image. The controller 16 which executes the processings at S3, S7, and S11 in FIG. 6 and at S21, S27, and S31 in FIG. 8 is one example of an image cutouter. The amount $\Delta\theta$ of change of the orientation of the vehicle 2 is one example of a first change amount. The time point when the own vehicle 26 is located at the vehicle position $P_1$ in FIG. 3A is one example of a first time point. The time point when the own vehicle 26 is located at the vehicle position $P_2$ in FIG. 3A is one example of a second time point. The time point when the own vehicle 32 is located at the vehicle position $P_3$ in FIG. 4A is another example of the first time point. The time point when the own vehicle 32 is located at the vehicle position $P_4$ in FIG. 4A is another example of the second time point. The time point when the own vehicle 42 is located at the vehicle position $P_5$ in FIG. 5A is another example of the first time point. The time point when the own vehicle 32 is located at the vehicle position $P_6$ in FIG. 5A is another example of the second time point. The left direction in the taken image (i.e., the direction directed from the outside of the curve toward the inside of the curve) is one example of a first direction. The right direction in the taken image (i.e., the direction directed from the inside of the curve toward the outside of the curve) is one example of a second direction. The time t required from taking of an image by the vehicle-mounted camera 18 to displaying of the cutout image on the display 20 is one example of the first period.

While the embodiment has been described above, it is to be understood that the disclosure is not limited to the details of the illustrated embodiment, but may be embodied with various changes and modifications, which may occur to those skilled in the art, without departing from the spirit and scope of the disclosure. In the above-described embodiment and modification, the controller 16 calculates the amount $\Delta\theta$ of change of the orientation of the vehicle 2 or the amount $\Delta\varphi$ of movement of the display object in the taken image and moves the cutout frame based on the calculated amount, but the present disclosure is not limited to this processing. The controller 16 may detect a state of the vehicle which relates to the change of the orientation of the vehicle and move the cutout frame based on the detected state. For example, the controller may obtain a steering angle of a steering wheel and move the cutout frame such that the amount of movement of the cutout frame is smaller when the steering angle is large than when the steering angle is small.

In the above-described embodiment, the controller 16 calculates the amount $\Delta\theta$ of change of the orientation of the vehicle 2 and moves the cutout frame by the moving distance L corresponding to the calculated amount $\Delta\theta$. However, the present disclosure is not limited to this processing. For example, when the amount $\Delta\theta$ of change of the orientation of the vehicle 2 is calculated, the controller 16 may move the cutout frame by a distance that is less than the moving distance L corresponding to the amount $\Delta\theta$ and may move the cutout frame by a distance that is greater than the moving distance L corresponding to the amount $\Delta\theta$.

Also, the image display device 4 may be configured such that a navigation device is used to detect that the vehicle 2 is to drive on a road (e.g., a curve) which may change the orientation of the vehicle 2, and when the controller detects that the vehicle 2 is to drive on such a road, the controller moves the cutout frame. In the case where the amount of change of the orientation of the vehicle or the amount of movement of the display object in the taken image is obtainable based on road information output from the navigation device, the controller 16 may change the distance L of movement of the cutout frame based on the obtained amount. In the first embodiment, the controller 16 estimates that the own vehicle 32 is to drive on the curve 30, based on the values output from the wheel-turning amount sensor 12 and the wheel speed sensors 14. However, the present disclosure is not limited to this processing. For example, the controller 16 may estimate that the own vehicle 32 is to drive on the curve 30, based on a value output from a sensor, examples of which include: a lateral acceleration sensor configured to detect gravity acceleration in the lateral direction of the vehicle 2 (i.e., the widthwise direction of the vehicle); and a gyrosensor configured to detect a rotation angle velocity (an angular speed) about an axis extending in a vertical direction of the vehicle 2.

The controller 16 may determine the magnitude of the amount of change of the orientation of the own vehicle 32 based on values output from the lateral acceleration sensor and the gyrosensor and determine the amount of movement of the cutout frame based on the determined magnitude of the amount of change of the orientation of the own vehicle 32. In the above-described embodiment, the cutout frame $Y_3$ is moved when the own vehicle 32 is to drive on the curve 30. However, the cutout frame $Y_3$ may be moved when the own vehicle 32 is to drive on a road other than the curve 30. For example, the cutout frame $Y_3$ may be moved when the own vehicle 32 is to drive on a road on which the orientation of the own vehicle 32 is changed during driving, such as a crank road bent substantially perpendicularly and an S-shaped road bent in an S shape.

What is claimed is:

1. An image display device, comprising:
a camera mounted on a vehicle and configured to take an image representing a view behind the vehicle;
an image cutouter configured to cut out a second image, from a first image taken by the camera, based on a reference cutout position in the first image; and
a display configured to display the second image cut out by the image cutouter,
the image cutouter being configured to, when a display object in the first image is to move in a first direction due to change of an orientation of the vehicle, execute a processing in which a cutout position for the second image at a first time point is moved from the reference cutout position in a second direction opposite to the first direction, wherein the image cutouter is configured to move the cutout position for the second image in the first image in the second direction, based on a first change amount that is an amount of change of the orientation of the vehicle in a first period extending from the first time point to a second time point that is later than the first time point.

2. The image display device according to claim 1, wherein the image cutouter is configured to:

calculate the first change amount; and execute a processing in which the cutout position for the second image in the first image at the first time point is moved in the second direction by an amount by which the display object in the first image is moved in accordance with the first change amount.

\* \* \* \* \*